United States Patent
McWilliams

(10) Patent No.: US 6,539,631 B1
(45) Date of Patent: Apr. 1, 2003

(54) TAPERED TRAILER WITH HORIZONTAL SEAMS AND SUPPORT RAILS

(75) Inventor: Cliff McWilliams, Katy, TX (US)

(73) Assignee: Vantage Dump Trailers, Inc., Katy, TX (US)

(*) Notice: Subject to any disclaimer, the term of this patent is extended or adjusted under 35 U.S.C. 154(b) by 0 days.

(21) Appl. No.: 09/708,865

(22) Filed: Nov. 8, 2000

(51) Int. Cl.[7] ............................................. B21D 53/88
(52) U.S. Cl. ...................... 29/897.2; 29/897.3; 29/445; 29/525.14; 228/153; 228/171
(58) Field of Search ................. 29/897, 897.2, 29/897.3, 897.312, 428, 525.14, 525.13, 445, 416, 417; 228/112.1, 153, 170, 171; 298/1 B, 1 R, 7, 17 R, 23 TT, 27, 17 B; 105/239, 247; 296/184, 39.2, 181, 183

(56) References Cited

U.S. PATENT DOCUMENTS

| | | | |
|---|---|---|---|
| 3,254,402 A | * 6/1966 | Balamuth et al. | 228/171 |
| 3,480,321 A | 11/1969 | Brandt et al. | 296/28 |
| 3,729,230 A | 4/1973 | Tomlinson, Jr. et al. | 298/7 |
| 3,929,321 A | * 12/1975 | Sims | 29/416 |
| 4,883,321 A | 11/1989 | Voigt | 298/17.7 |
| 5,005,893 A | 4/1991 | McCrary | 296/21 |
| 5,090,773 A | 2/1992 | Guillaume | 298/17 |
| 5,205,468 A | * 4/1993 | Budenbender | 228/170 |
| 5,460,431 A | 10/1995 | McWilliams | 298/22 |
| 5,532,451 A | * 7/1996 | La Rocca | 228/170 |
| 5,662,264 A | * 9/1997 | Gustafsson et al. | 228/170 |
| 6,048,628 A | * 4/2000 | Hillmann et al. | 228/171 |

* cited by examiner

*Primary Examiner*—Greg Vidovitch
*Assistant Examiner*—T. Nguyen
(74) *Attorney, Agent, or Firm*—Head, Johnson & Kachigian

(57) ABSTRACT

A process for manufacturing a sidewall for a trailer in the shape of a trapezoid having a right edge and a left edge of differing lengths and the top edge perpendicular to the right and left edges. A first rectangular sheet has lengths of a top and a bottom edge equal to a desired length of the sidewall. The second rectangular sheet is fabricated with top and bottom edges having a sufficient length so that right and left edges of the second sheet extend beyond the right and left edges of the first sheet. The second rectangular sheet is placed either on top of or underneath the first sheet so that the second sheet slopes downward either from the right to the left or from the left to the right at an angle with respect to the first sheet. The second rectangular sheet is welded to the first rectangular sheet along the entire length where the first rectangular sheet and the second rectangular sheet overlap thereby forming a seam.

6 Claims, 5 Drawing Sheets

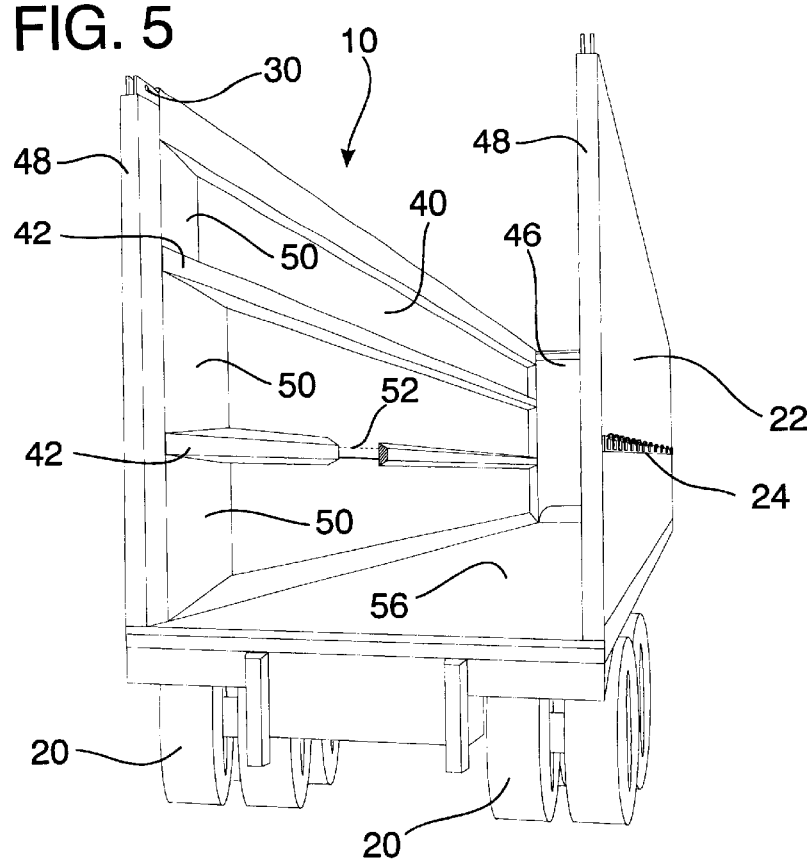
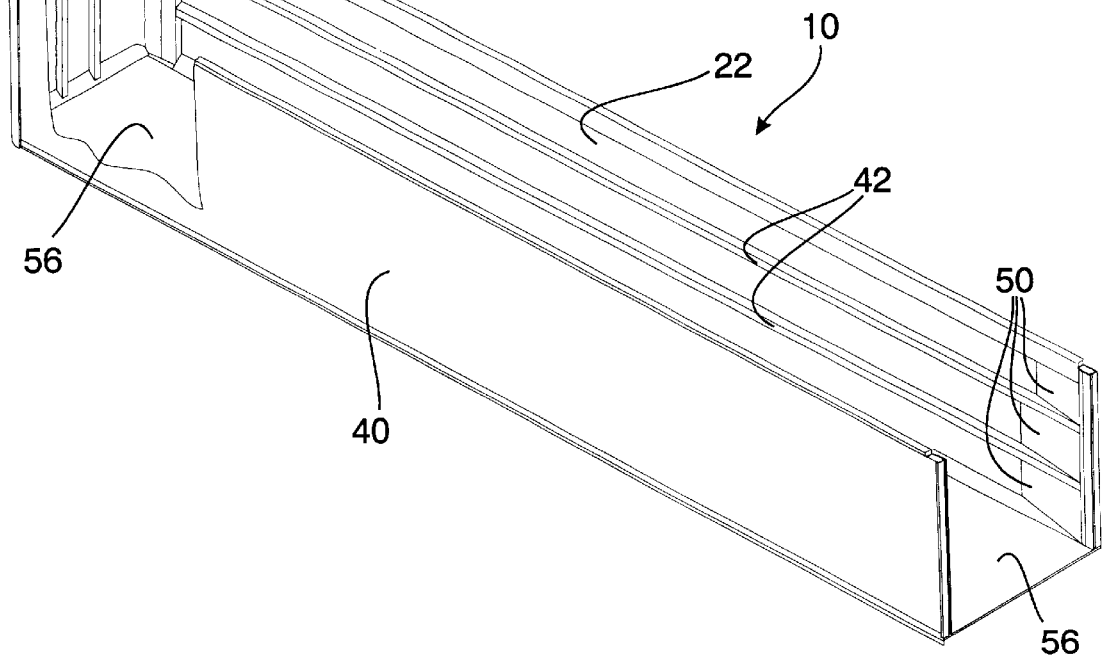

TAPERED TRAILER WITH HORIZONTAL SEAMS AND SUPPORT RAILS

BACKGROUND OF THE INVENTION

1. Field of the Invention

The present invention is directed to a trailer for a dumping vehicle. In particular, the present invention is directed to a tipper trailer wherein the sidewalls are constructed of metal sheets welded together along horizontal seams that are covered by horizontal rails on the interior surfaces of the sidewalls and wherein the floor of the tipper trailer slopes downward from the front to the rear. One or more additional horizontal rails may be attached to the interior surfaces to provide added support for the sidewalls.

2. Prior Art

Tipper trailers are used to transport cargo, such as garbage or other materials, behind trucks or other vehicles. The cargo is dumped from a tipper trailer by moving the trailer onto a platform, detaching the truck, and then tilting the platform so that the front end of the tipper trailer is raised above the rear end, and the cargo slides out the rear end by force of gravity. Unlike a dump trailer, the platform provides the tilting force to raise the trailer between the loading and unloading positions.

The sidewalls of tipper trailers are typically constructed from sheets of aluminum that are welded together along their sides so that a series of vertical seams are produced. The vertical seams provide wear points where a weakness can occur as the cargo slides over the sidewalls during dumping of a tipper trailer.

In the prior art, vertical rails have been placed over the seams to protect the seams from wear and also to provide support for the sidewalls. If the vertical rails are placed in the interior of a tipper trailer, they interfere with the discharge of the cargo during dumping. Typically, therefore, vertical rails are placed on the exterior of a tipper trailer so that the interior is smooth. Placing rails on the exterior of a tipper trailer results in a reduction of the interior volume available for cargo, since the overall width of the tipper trailer is limited by traffic laws. In addition, numerous vertical seams and vertical rails are required in the construction of a tipper trailer, because the lengths of the sidewalls are typically many times their height, and the expense of welding numerous sheets of metal together and welding numerous rails onto the sidewalls significantly increases the cost of manufacturing a tipper trailer.

Also, in the prior art, the floor of a tipper trailer is constructed so that it is at a minimum height in order to accommodate the hitch (or fifth wheel) to the truck or other vehicle used to pull the tipper trailer. The floor is typically parallel to the ground throughout. The overall height, width, and length of the tipper trailer are all limited by traffic laws. Therefore, the height of the floor affects the interior volume and capacity of the tipper trailer for cargo.

It is, therefore, an object and purpose of the present invention to provide a tipper trailer with a strong structure that will withstand wear and tear during loading, transporting, and dumping operations and have a long useful life.

It is a further object and purpose of the present invention to provide a tipper trailer with a configuration that will facilitate the sliding of the cargo from its interior during dumping.

It is a further object and purpose of the present invention to provide the maximum interior volume for a tipper trailer whose overall height, width, and length are limited by traffic laws.

It is a further object and purpose of the present invention to provide a tipper trailer that may be manufactured quickly at minimum cost that will satisfy the other objects of the invention.

SUMMARY OF THE INVENTION

The present invention provides a trailer that has a primary application for the transporting and dumping of materials, such as garbage. The tipper trailer includes a front, a rear, two opposing sidewalls, and a floor extending between the sidewalls and from the front to the rear that is supported by a plurality of wheels. The front, rear, opposing sidewalls and floor form an open top container for the receipt of the materials to be transported. During loading and transportation of cargo, the tipper trailer is substantially parallel to the ground and it is attached to and moved by a truck or other vehicle. At the rear is a rear tail gate that is hinged at the top, bottom, or one of the sides so that it can swing open for unloading.

The trailer is emptied by backing or pulling it on to a tipper platform and detaching it from the truck or other vehicle that was used to transport it. The tipper platform has a flat section for the trailer and a hydraulic mechanism to lift the trailer. The tipper platform is then tilted so that the front end of the tipper trailer is raised above the rear and the cargo slides out the rear by force of gravity.

The opposing sidewalls of the trailer are constructed by welding two large sheets of aluminum to form horizontal seams running along their entire length. The sheets of aluminum for the sidewalls are stored on large rolls. Although the width of the sheets is variable, typically, the widest available sheets are not wide enough for the entire sidewall height. By way of example and not limitation, the maximum width of a sheet might be 96", while the height of the sidewall could be 115".

The horizontal seams are wear points which are reinforced by covering them with horizontal rails that are placed on the interior surfaces of the sidewalls. Other horizontal rails are attached to the interior surfaces of the sidewalls to provide them with added strength. The floor is higher at the front of the tipper trailer than at the rear in order to accommodate the hitch (or fifth wheel) to the truck or other vehicle to which the tipper trailer is attached. Stated in other words, the sidewalls are higher at the rear than at the front. Making the floor lower at the rear than in the front maximizes the interior volume available for cargo for a given overall height, width and length of a tipper trailer.

The floor of the trailer also tapers and is wider at the rear then the front in order to promote unloading of the trailer cargo.

BRIEF DESCRIPTION OF THE DRAWINGS

FIG. 5 is a perspective view of the trailer shown in FIG. 1, apart from the platform, taken from behind the rear end of the tipper trailer;

FIG. 6 is a perspective view of the trailer shown in FIG. 5, partially cut-away, showing the interior of the tipper trailer viewed from above the tipper trailer;

DETAILED DESCRIPTION OF THE PREFERRED EMBODIMENTS

Figure 1:
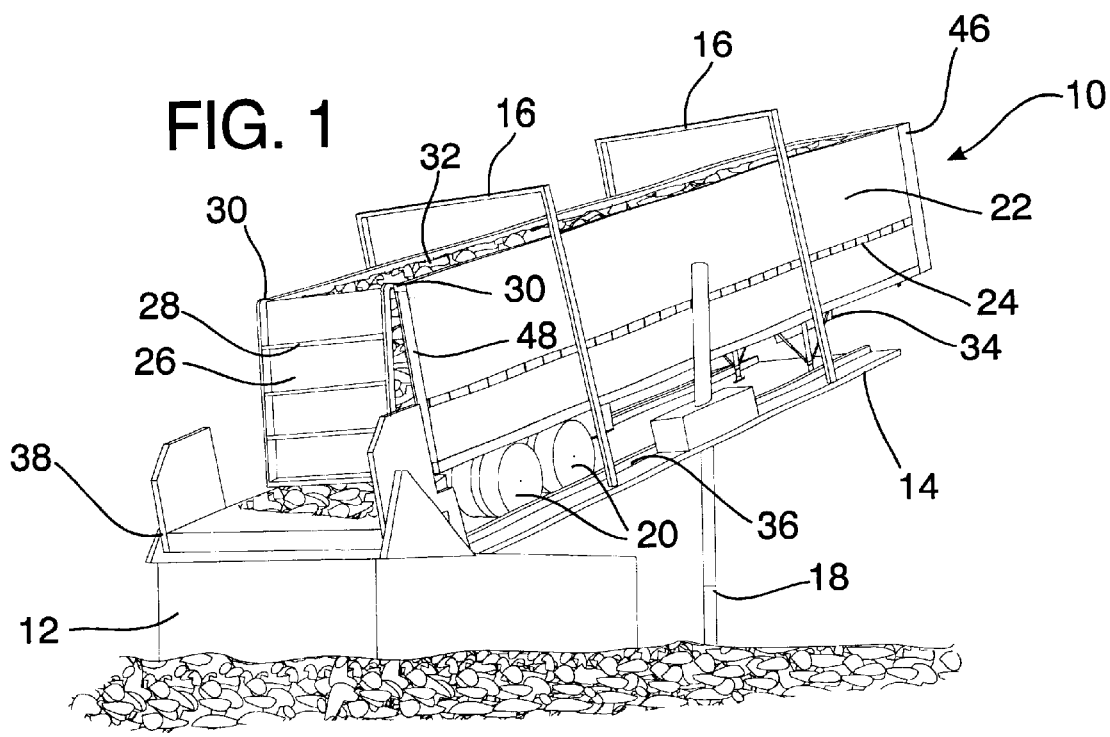
FIG. 1 is a perspective view of a trailer constructed in accordance with the present invention, with the trailer placed on a platform in a partially tilted position.

Referring to the drawings in detail, FIG. 1 is a perspective view of a tipper trailer 10 shown from behind and to the side of the rear end 48 of the tipper trailer. The tipper trailer is shown fully loaded with cargo 32, which may be a variety of materials, including loose materials such as stones or garbage. As shown in FIG. 1, the tipper trailer is in the process of being unloaded by being placed on a platform 14 which is raised at one end so that the tipper trailer is tilted and the cargo slides out the rear end by force of gravity. Various tipper platforms are well known in the art.

The trailer may be built to various dimensions. In one embodiment, for example, the trailer has a cubic capacity of up to 150 cubic yards and has a rated carry capacity of up to 80,000 pounds. The trailer may be constructed of aluminum alloy, steel or other sturdy materials such as polycarbonate.

During unloading, the tipper trailer 10 is supported by a plurality of rear wheels 20 and two front supports 34. To hold the tipper trailer in place while it is being unloaded, two tipper platform floor rails 36 extend along the length of the platform 14 and two braces 16 attach to the platform and extend along the sides and top of the tipper trailer. The platform is supported by a rear base 12 and two hydraulic telescoping cylinders 18. During unloading of the tipper trailer, the platform is rotated about its rear end 38, which forms a transverse axis.

The perspective view in FIG. 1 shows the right sidewall 22 extending from the front end 46 to the rear end 48 of the tipper trailer 10. The right sidewall 22 extends substantially vertically from the floor. The right sidewall is manufactured from two metal sheets which are welded together along a seam 24. There are no exterior ribs required to provide support for the right sidewall. In FIG. 1, the rear tail gate 26 is shown in a partially open position for unloading. The rear tail gate is attached to the top of the rear end of the right and left sidewalls by hinges 30 so that it will swing open during unloading. In contrast to the right sidewall, the rear tail gate has external ribs 28 for additional strength and support. It will be understood that the rear tailgate may be mounted to swing open or be removed in any fashion within the scope of the invention.

Figure 2:
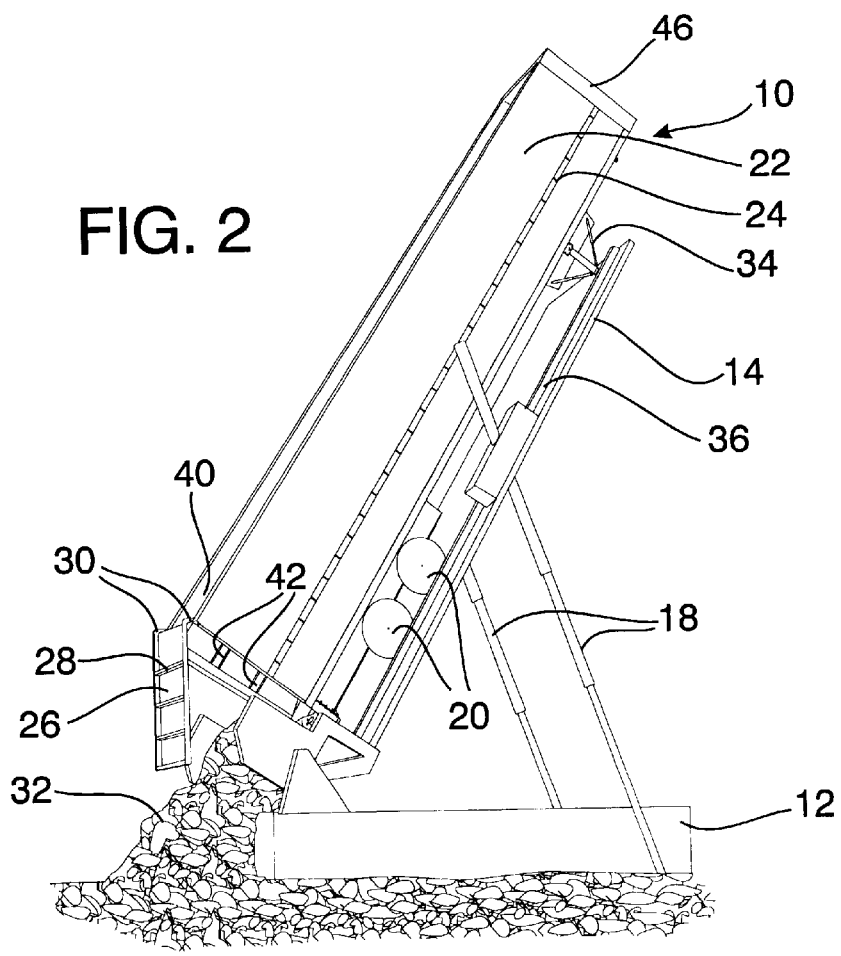
FIG. 2 is a perspective view of the trailer shown in FIG. 1 taken from a different perspective, with the platform in a full tilted position for unloading.

FIG. 2 illustrates the tipper trailer in FIG. 1 in a fully tilted position near the end of the unloading process. With the tipper trailer empty of cargo, a part of the interior surface of the left sidewall 40 can be seen with three horizontal rails 42 (a top rail and two horizontal rails) providing additional strength and support. The horizontal rails, in combination with the vertical posts at the front and rear, provide adequate support.

Figure 3:
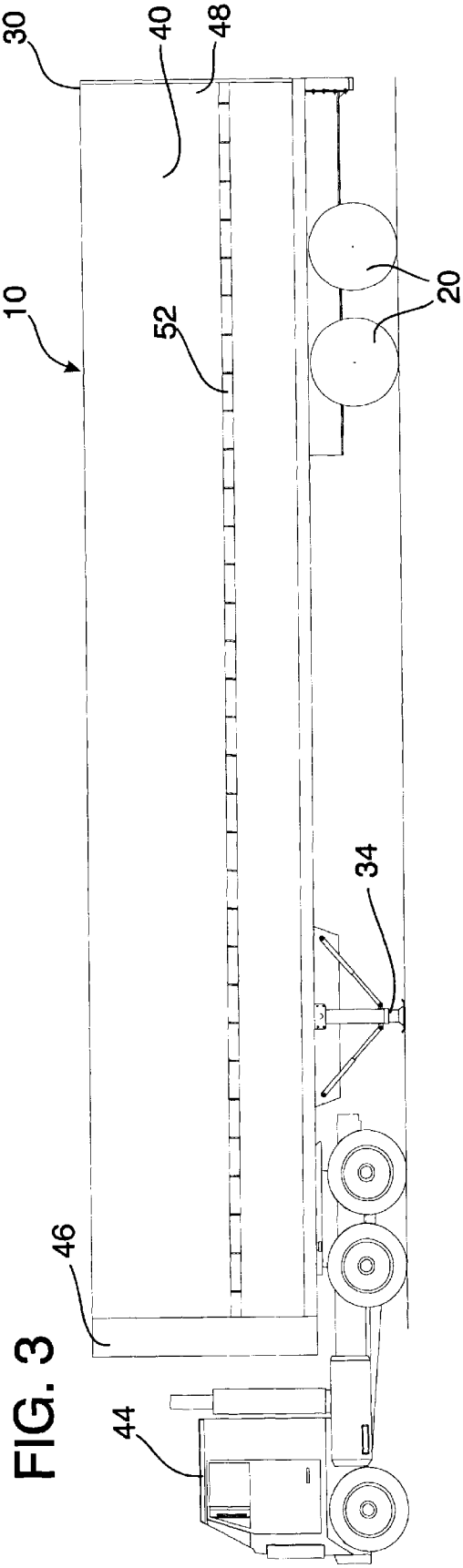
FIG. 3 is a side view of the trailer shown in FIG. 1 that is attached to a truck for transporting the tipper trailer.

FIG. 3 is a side view of the tipper trailer 10 showing the tipper trailer attached to a truck 44. During loading and transportation of the cargo, the tipper trailer is substantially parallel to the ground as shown in FIG. 3. FIG. 3 illustrates the exterior surface of the left sidewall 40 including the seam 52 that resulted from welding two metal sheets together to form the left sidewall. It will be noted that there are no vertical support posts required with the exception of the internal front and rear vertical posts.

Figure 4:
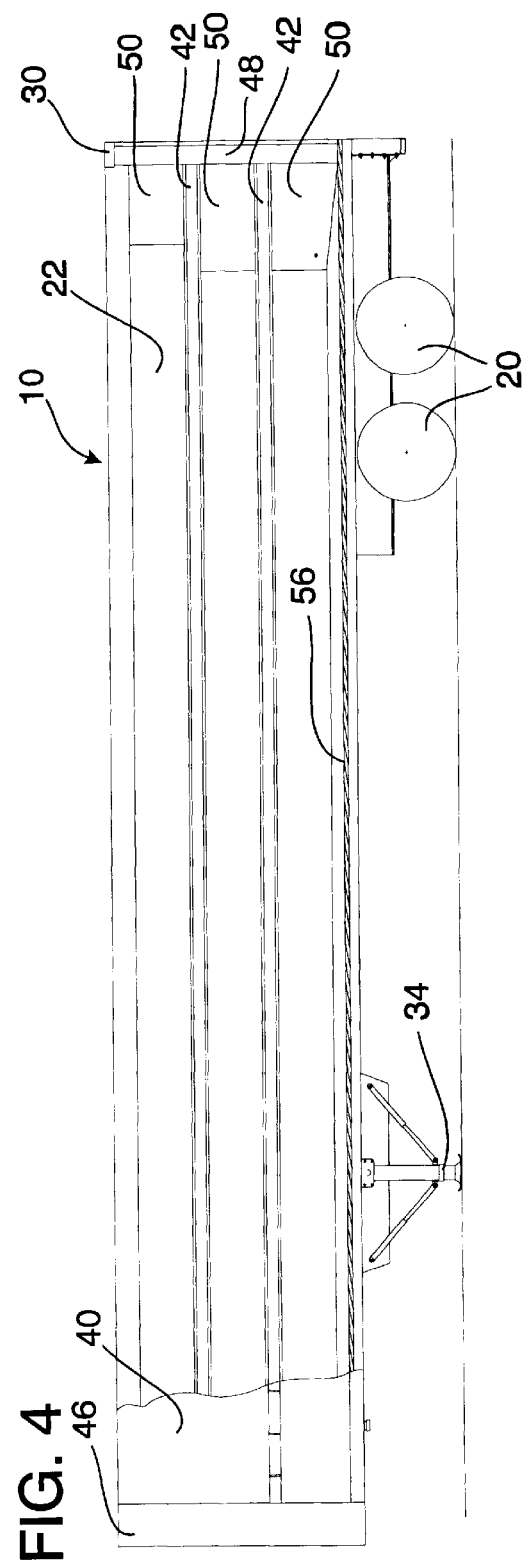
FIG. 4 is a sectional view of the trailer shown in FIG. 3, apart from the truck, taken from the side of the tipper trailer and showing the interior side of a sidewall.

FIG. 4 is a sectional view of the tipper trailer 10, apart from the truck 44 shown in FIG. 3. FIG. 4 illustrates the interior surface of the right sidewall 22. Extending along the length of the interior surface of the right sidewall from the front end 46 to the rear end 48 of the tipper trailer are two horizontal rails 42 and a top rail, which provide additional strength and support for the right sidewall. While the embodiment illustrated in FIG. 3 has two horizontal rails attached to the right sidewall, additional horizontal rails may be attached to the sidewalls to provide greater strength and support. Because the horizontal rails are aligned along the direction that the cargo moves when the tipper trailer is unloaded, the horizontal rails provide less resistance to the movement of the cargo during unloading than vertical rails would. Also shown in FIG. 4 are three angled shims or transition plates 50 which are attached to the rear end of the sidewall above and below each horizontal rail. The angled transition plates or shims facilitate the unloading of cargo by preventing the cargo from being trapped inside the tipper trailer at its rear end due to the square corners being formed by the rear's vertical post.

FIG. 5 is a perspective view from behind the rear end 48 of the tipper trailer 10 with the rear tail gate 26 in FIG. 1 removed for ease of viewing. FIG. 5 shows the interior surface of the left sidewall 40 with two horizontal rails 42 and a top rail extending from the front end 46 to the rear end of the tipper trailer. A partial sectional view of the lower horizontal rail is shown to illustrate that it covers the seam 52 that resulted from welding two metal sheets together to form the left sidewall. It will be observed that the sidewalls 24 and 40 are positioned at the widest position of the trailer to maximize the load volume. Finally, FIG. 5 shows the floor 56 of the tipper trailer that extends from the front end to the rear end and between the left sidewall and the right sidewall 22.

FIG. 6 is a perspective view of the tipper trailer 10 viewed from above the tipper trailer with a part of the left sidewall 40 cut away in order to show two vertical rails 54 on the interior surface of the front end 46 of the tipper trailer. The vertical rails on the interior surface of the front end provide additional strength and support for the front end without interfering with the movement of the cargo during unloading of the tipper trailer.

Figure 7:
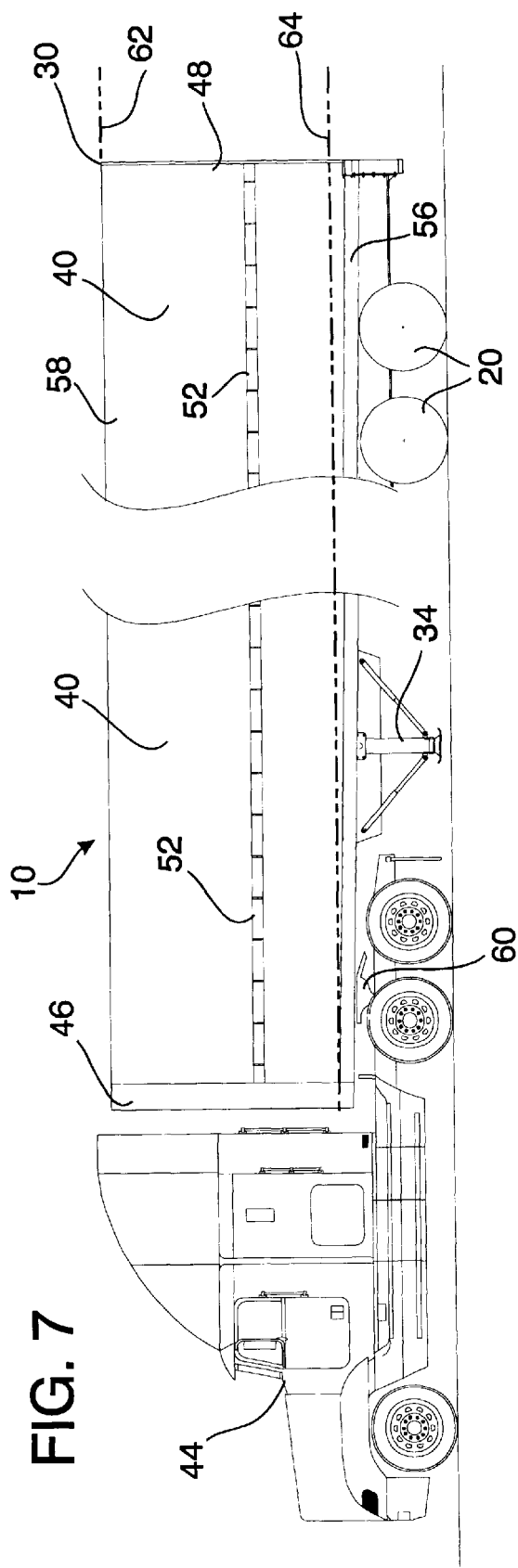
FIG. 7 is a side view of the trailer shown in FIG. 5, partially cut-away, showing the downward slop of the floor of the trailer from front to rear.

FIG. 7 is a side view of the tipper trailer 10 that illustrates the downward slope of the floor 56 from the front end 46 to the rear end 48 of the tipper trailer. A hitch 60 (or fifth wheel) attaches the tipper trailer to the truck 44 that transports the tipper trailer. In order to accommodate the hitch, the floor is raised at the front end of the tipper trailer. The dashed lines 62 and 64 are parallel to the ground, and the dashed lines illustrate how the top 58 is parallel to the ground from the front end to the rear end of the tipper trailer, while the floor slopes downward from the front end to the rear end of the tipper trailer. In the present embodiment, the distance from the floor to the top is 111 inches at the front end of the tipper trailer, while the distance from the floor to the top is 115 inches at the rear end of the tipper trailer. It is understood that the foregoing dimensions may vary within the scope of the invention.

Figure 8:
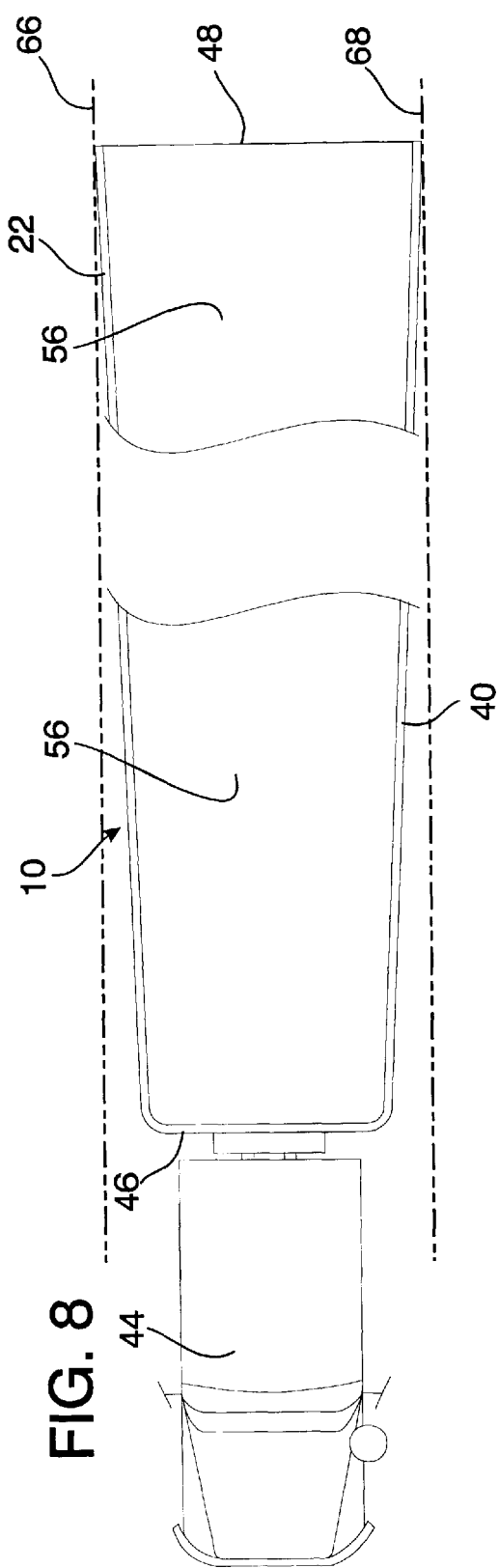
FIG. 8 is top view of the trailer shown in FIG. 5, partially in section, showing the width of the tipper trailer increasing from front to rear.

FIG. 8 is a top view of the tipper trailer 10 that illustrates the width of the floor 56 increasing from the front end 46 to the rear end 48 of the tipper trailer in order to facilitate the movement of the cargo towards the rear end during unloading. The dashed lines 66 and 68 are parallel to each other and perpendicular to the front end and rear end of the tipper trailer, and the dashed lines illustrate the increase in the width of the floor from the front end to the read end of the tipper trailer.

Figure 9:
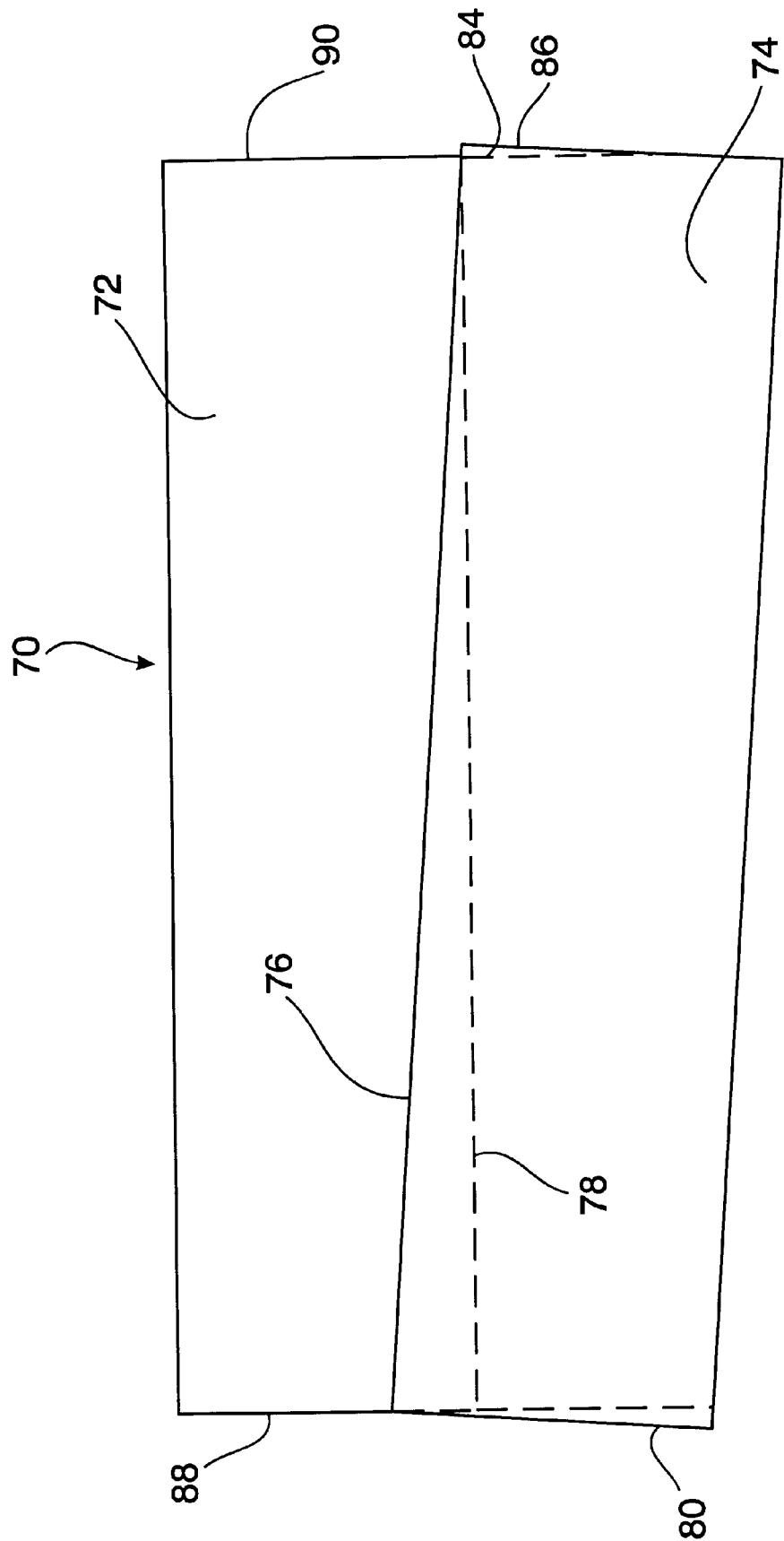
FIG. 9 is a side view of a sidewall of a trailer in the shape of a trapezoid manufactured from two overlapping rectangular metal sheets.

FIG. 9 is a diagrammatic view of a sidewall 70 in the shape of a trapezoid manufactured by placing a first rectangular metal sheet 72 beneath a second rectangular metal sheet 74 so that 1) both rectangular metal sheets overlap along the entire length at the bottom 78 of the first rectangular sheet, and 2) the top 76 of the second rectangular sheet is at an acute angle with respect to the bottom of the first rectangular sheet.

The sidewall is manufactured from two lengths of sheet metal. The area shown overlapping is trimmed away. Thereafter, the sheets are welded together. Alternatively, the sidewall is manufactured by first welding both rectangular sheets together along the top of the second rectangular sheet. Then the metal between the bottom of the first rectangular sheet and the top of the second rectangular sheet is trimmed away. Finally, the left side 88 and the right side 90 of the sidewall are squared by trimming away the metal between the left side 80 of the second rectangular sheet and a line formed by extending the left side 88 of the first rectangular sheet and the metal between the right side 86 of the second rectangular sheet and a line formed by extending the right side 90 of the first rectangular sheet.

The present invention has been described in relation to the drawings attached hereto. It should be understood that other modifications besides those shown or suggested above may be made within the spirit and scope of this invention.

What is claimed is:

1. A process for manufacturing a sidewall for a trailer in the shape of a trapezoid, having a right edge and a left edge of differing lengths, a top edge perpendicular to said right and left edge, and a bottom edge in angular relation to said top edge, which process comprises:
    fabricating a first rectangular sheet having a top, bottom, right and left edge, with the lengths of said top and bottom edges being equal to a desired length of said sidewall;
    fabricating a second rectangular sheet having a top, bottom, right and left edge, having said top and bottom edges longer than said top and bottom edges of said first sheet, said second sheet thicker than said first sheet;
    trimming a triangular portion from each of said top, right and left edges of said second sheet; and
    welding said top edge of said second sheet to said bottom edge of said first sheet to form said trapezoid.

2. A process for manufacturing a sidewall for a trailer in the shape of a trapezoid, having a right edge and a left edge of differing lengths and a top edge that is perpendicular to said right and left edges, which process comprises:
    fabricating a first rectangular sheet of metal that has a top, bottom, right and left edge, with the lengths of said top and bottom edge being equal to a desired length of said sidewall;
    fabricating a second rectangular sheet of metal that has a top, bottom, right and left edge, with said top and bottom edges having a sufficient length so that said right and left edges of said second rectangular sheet extend beyond said right and left edges of said first rectangular sheet when said second rectangular sheet is placed either on top of or underneath said first rectangular sheet at an angle as described in the next step;
    placing said second rectangular sheet either on top of or underneath said first rectangular sheet so that:
        said rectangular sheets overlap along their lengths;
        said second rectangular sheet slopes downward either from the right to the left or from the left to the right of said second rectangular sheet at an angle with respect to said first rectangular sheet; and
        said right and left sides of said second rectangular sheet extend beyond said right and left edges of said first rectangular sheet; and
    welding said top side of said second rectangular sheet to said first rectangular sheet along the entire length where said first rectangular sheet and said second rectangular sheet overlap thereby forming a seam along which said first rectangular sheet and said second rectangular sheet are connected to one another.

3. A process for manufacturing a sidewall for a trailer as set forth in claim 2 including the additional steps of:
    trimming said first rectangular sheet to remove a portion of said first rectangular sheet between said bottom of said first rectangular sheet and said seam; and
    trimming said second rectangular sheet so that said right and left edges of said second rectangular sheet are in line with said right and left sides of said first rectangular sheet and thereby are perpendicular to said top edge of said first rectangular sheet.

4. A process of manufacturing a sidewall for a trailer in the shape of a trapezoid as set forth in claim 2 wherein an interior rail is welded onto said seam along which said second rectangular sheet was welded to said first rectangular sheet.

5. A process of manufacturing a sidewall for a trailer in the shape of a trapezoid as set forth in claim 2 wherein one or more horizontal rails running from said right edge to said left edge of said sidewall are welded onto said sidewall.

6. A process for manufacturing a sidewall for a trailer having a right edge and a left edge of differing lengths and a top edge that is perpendicular to said right and left edges, which process comprises:
    fabricating a first rectangular sheet having a top, bottom, right and left edge with the lengths of said top and bottom edge being equal to a desired length of said sidewall;
    fabricating a second rectangular sheet with said top and bottom edges having a length longer than said top and bottom edges of said first sheet;
    placing said second sheet either on top of or underneath said first rectangular sheet so that said sheets overlap along their lengths, and said second sheet slopes downward either from the right to the left or from the left to the right of said second sheet at an angle with respect to said first sheet; and
    welding said second sheet to said first sheet along the length where said first sheet and second sheet overlap thereby forming a seam.

* * * * *